(12) United States Patent
Peelen et al.

(10) Patent No.: US 7,177,273 B2
(45) Date of Patent: Feb. 13, 2007

(54) COMMUNICATION SYSTEM WITH A SHARED MEDIUM

(75) Inventors: B F Peelen, Twente (NL); Jan-Peter Sanderman, Twente (NL)

(73) Assignee: Lucent Technologies Inc., Murray Hill, NJ (US)

( * ) Notice: Subject to any disclaimer, the term of this patent is extended or adjusted under 35 U.S.C. 154(b) by 989 days.

(21) Appl. No.: 10/133,781

(22) Filed: Apr. 26, 2002

(65) Prior Publication Data

US 2003/0202532 A1   Oct. 30, 2003

(51) Int. Cl.
*H04L 12/56* (2006.01)
(52) U.S. Cl. ...................... 370/230; 370/445
(58) Field of Classification Search ............... 370/229, 370/464, 468

See application file for complete search history.

(56) References Cited

U.S. PATENT DOCUMENTS

| | | | |
|---|---|---|---|
| 7,009,992 B2 * | 3/2006 | McKinnon et al. | 370/443 |
| 2002/0075844 A1 * | 6/2002 | Hagen | 370/351 |

* cited by examiner

*Primary Examiner*—Derrick W. Ferris

(57) ABSTRACT

A shared medium provides a limited amount of bandwidth for communication between nodes. A contention based access protocol is used to access the medium from the nodes. A guaranteed amount of the bandwidth is reserved for quality of service transmission. A controller computes amounts of assigned bandwidth for the nodes so as to track an on-line predicted demand for bandwidth of each node. The amounts of assigned bandwidth are computed so that the sum of the amounts of assigned bandwidth not exceeding a total available amount of bandwidth minus the amount of guaranteed bandwidth reserved for quality of service transmissions. The controller sets regulators in the respective nodes so as to prevent the nodes from attempting to use more than the amounts of assigned bandwidth for the nodes for transmissions other than quality of service transmissions.

10 Claims, 2 Drawing Sheets

COMMUNICATION SYSTEM WITH A SHARED MEDIUM

FIELD OF THE INVENTION

The invention relates to a data communication method and system that uses a shared medium and in particular to allocation of communication bandwidth in such a data communication system and method.

BACKGROUND OF THE INVENTION

A communication system that uses a shared medium contains a number of devices called "nodes" that are capable of sending and receiving data via a shared medium. The shared medium provides a limited amount of bandwidth, part or whole of which may be used for transmission by any one of the nodes. An example of a data communication system that uses a shared medium is a wireless LAN (Local Area Network). A wireless LAN system contains nodes that are located near one another and are capable of sending and receiving wireless electromagnetic communication signals. Thus the shared medium is the electromagnetic field in the local area where the nodes are located. The bandwidth in this medium may be divided in time-intervals and different frequency channels. Only one node at a time can transmit in a frequency channel. Other examples of such media are cables or optical fibers over which more than one node can send or receive data.

In a communication system that uses a shared medium some mechanism is needed to ensure that the available bandwidth is shared by the nodes. Conventional mechanisms provide for fixed bandwidth allocation and for contention based bandwidth allocation.

In a fixed bandwidth allocation mechanism each nodes is permitted to use a predetermined part of the bandwidth, for example a periodically recurring time-slot. This mechanism is particularly useful for transmitting data streams which need "Quality of Service", that is, a guaranteed minimum data rate per unit time, for example audio and video data streams with data that has to be rendered real time at the speed at which it is received. The fixed bandwidth allocation mechanism is rather wasteful when a node needs to transmit data only incidentally. In this case much of the allocated bandwidth may be left unused.

In a contention based bandwidth allocation mechanism all nodes may attempt to use the same part of the bandwidth. This mechanism is a "best effort" mechanism that allows each particular node to use as much of the bandwidth as is left over by other nodes, as far as needed by the particular node. Each node attempts to use the bandwidth only when it needs to transmit data. Some mechanism is provided for resolving conflicts, when more than one node attempts to use the same part of the bandwidth. This mechanism provides for a more efficient use of the available bandwidth when the nodes need to transmit data only incidentally.

Contention based bandwidth allocation mechanisms have been applied widely in modern computer systems, for example in PC's (Personal Computers). It is very easy to interface an application program to such an allocation mechanism. The application program simply supplies data to a communication program which takes care of the contention mechanism. There exists an enormous number of application programs that makes use of such communication.

However, by itself a contention based bandwidth allocation mechanism does not ensure that any node can provide Quality of Service (transmit data at a guaranteed rate per unit time). At a time when too many nodes attempt to transmit too much data a node may get too little bandwidth to provide Quality of Service. Conventionally, therefore, if one or more of the application programs need Quality of Service a conventional fixed bandwidth allocation mechanism must be used, but this leads to waste of bandwidth when other application programs supply data only incidentally, as is the case for most existing application programs.

SUMMARY OF THE INVENTION

Amongst others, it is an object of the invention to provide for a communication system and a method of communication that supports Quality of Service and yet allows efficient use of bandwidth.

Amongst others, it is a further object of the invention to provide for a communication system and a method of communication that supports Quality of Service and efficient use of bandwidth for existing application programs that are operable with a contention based interface.

Amongst others, it is a further object of the invention to provide for a communication system and a method of communication that supports Quality of Service and efficient use of bandwidth for shared media that can use a relay node to interface either with other nodes in the medium or to devices coupled to a further medium.

Amongst others, it is another object of the invention to provide for a communication system and a method of communication that supports Quality of Service using a contention based access mechanism to shared bandwidth.

According to the invention the communication system uses contention based access to the shared medium with a mechanism to regulate on-line the maximum use that will be made of bandwidth. The system is provided with a controller that predicts on-line how much need the various nodes will have to use bandwidth. On the basis of this prediction the controller assigns bandwidth to the nodes, so that the assigned bandwidth of each node tracks the demand from the node with the limitation that the sum of transmissions that do not require quality of service will use no more bandwidth than compatible with the amount of bandwidth needed to provide quality of service. The controller sets regulators in the nodes so to prevent that the nodes will attempt to use more than their assigned bandwidth. Thus, and on one hand it is ensured that the nodes will be able to use contention to make near optimal use of the available bandwidth, but on the other hand it is ensured that contention will leave sufficient bandwidth to support quality of service.

Preferably, the controller distributes the excess bandwidth (in excess of the amount of bandwidth needed to provide quality of service) over the assigned bandwidths for the nodes proportionally to the predicted need of the nodes. Thus, a fair distribution is realized which ensures that a node get more bandwidth when it needs bandwidth for transmission.

In an embodiment each nodes measures the quantity of data queued at the node and reports the measured quantity to the controller for prediction of the future demand. Because measurements are used application programs that generate the data expecting to use contention based access need not be modified to operate in the system according to the invention. In a further embodiment the controller computes at least part of the assigned amount of bandwidth for a first one of the nodes from a product of the access bandwidth and a ratio of the measured quantity of data of that node and the sum of the measured quantities of data from different nodes. This provides a straightforward way of setting the assigned amount of bandwidth.

Preferably, another part of the assigned amount of bandwidth of the node is a predetermined fixed amount. This permits some bandwidth even if the node does not transmit for some time. Also preferably, the excess bandwidth is computed by subtracting a predicted amount of unavailable bandwidth from the theoretically available bandwidth.

In another embodiment the system contains a relay node that relays transmissions destined for nodes that are coupled to the shared medium. In this case transmissions destined from nodes coupled to the medium destined to nodes coupled to the medium consume double the bandwidth of similar transmissions to or from other locations (e.g. in a network outside the medium). Therefore, when a node reserves a certain amount of bandwidth for quality of service transmission, the controller determines whether this bandwidth is to be used for transmission to a node coupled to the medium or not. When bandwidth is to be used for transmission to a node coupled to the medium the controller subtracts twice the amount of bandwidth from the available bandwidth in order to determine the excess bandwidth that may be used for transmissions that need not provide quality of service.

In another embodiment the controller computes separate demands for bandwidth for non-quality of service transmissions that do and do not involve relay of transmissions. When the controller tracks the demand the transmissions that do involve relay of transmissions count twice. Thus controller more accurately tracks the actual demand.

BRIEF DESCRIPTION OF THE DRAWINGS

These and other objects and advantageous aspects of the system and method according to the invention will be described in more detail using the following figures.

DETAILED DESCRIPTION

Figure 1:
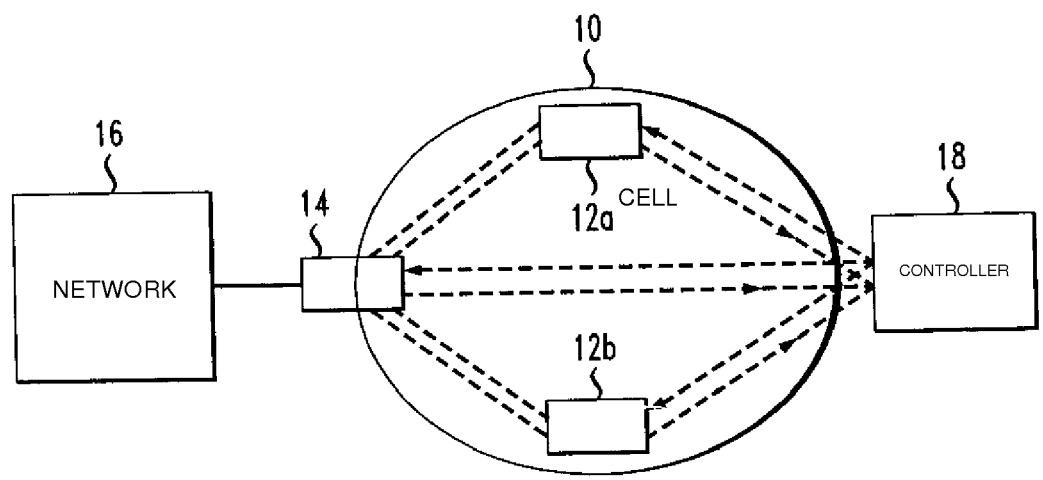
FIG. 1 shows a communication system.

FIG. 1 shows a communication system. By way of example a wireless LAN system is shown, but it must be understood that the invention applies to other systems with a shared medium as well. The communication system contains a number of devices 12a,b, 14, called "nodes" hereinafter, that are capable of communicating with wireless electromagnetic fields. Although three nodes 12a,b, 14 are shown by way of example it will be understood that any number of nodes may be used. A region of space 10 is shown (referred to as "wireless cell" hereinafter) in which each of the nodes 12a,b, 14 can generate modulated electromagnetic field oscillations. One of the nodes 12a,b, 14 is a relay node 14 that is coupled to a network 16. Furthermore a controller 18 is shown that is capable of communicating with the nodes 12a,b, 14. The controller is preferably part of a node (for example the relay node 14 or a node in the network 16 or a node in cell 10) and communicates with the nodes 12a,b 14 via the wireless communication mechanism of the cell 10, but without deviating from the invention other means of communication between controller 18 and nodes 12a,b, 14 may be used.

Figure 2:
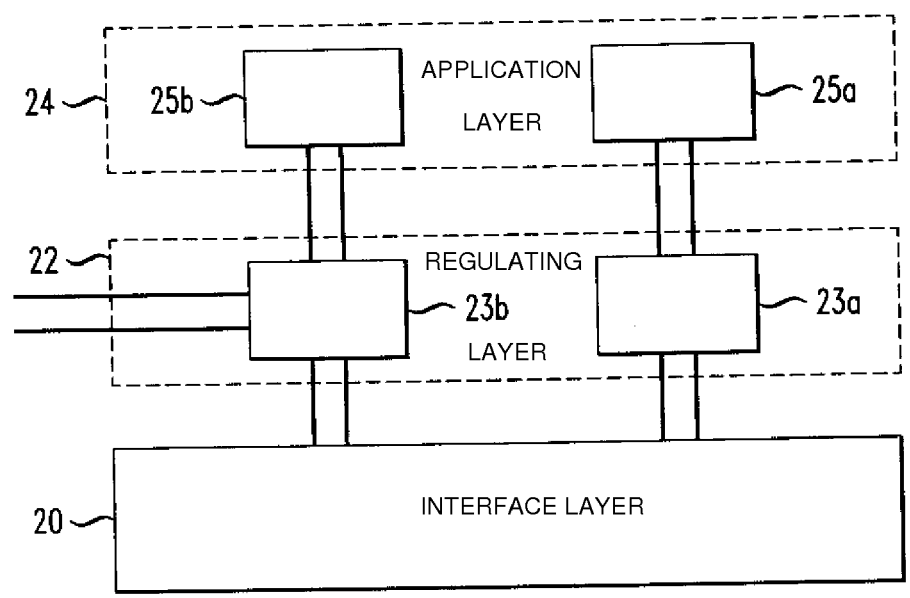
FIG. 2 shows a node architecture.

FIG. 2 shows a typical architecture of a node 12a,b, 14. The node contains an interface layer 20, a regulating layer 22 and an application layer 24. The word "layer" is used to signify that each layer may be implemented in any way, for example by means of a dedicated piece of hardware or as a computer program executed by a piece of hardware that may or may not be shared between different layers. Data is generated in the application layer 24, which passes the data to regulating layer 22. Regulating layer passes the data to interface layer 20. Interface layer 20 generates physical signals (electromagnetic field oscillations in the case of a wireless LAN) onto which messages containing the data are modulated. In return regulating layer 22 and interface layer 20 may indicate to application layer 24 and regulating layer 22 respectively whether subsequent data can be accepted. Similarly, interface layer 20 receives physical signals, demodulates the messages from the physical signals and passes the data from the messages to application layer 24.

In operation, each node 12a,b, 14 is capable of generating a modulated oscillations of the electromagnetic field in cell 10 to send messages addressed to other nodes 12a,b, 14 in cell 10. Thus, the electromagnetic field in the wireless cell 10 forms a shared medium via which the nodes 12a,b, 14 can communicate.

The consequence of using a shared medium is that messages from no more than one node 12a,b, 14 can be received at a time, at least in the same frequency channel. If more than one node 12a,b 14 generates signals simultaneously, the messages carried by those signals cannot be separately received. Hence, these messages are either lost or have to be retransmitted.

The interface layer 20 implements a contention mechanism to minimize the loss of messages, allowing nodes 12a,b, 14 to transmit signals via the shared medium with a minimum of disturbance from the other nodes 12a,b, 14. The contention mechanism minimizes the number of times that more than one node 12a,b 14 generates signals simultaneously. Any mechanism may be used. For example, a conventional mechanism is that the interface layer 20 in each node 12a,b monitors whether signals are being transmitted in the cell 10. When a message is offered to interface layer 20 by regulating layer 22 interface layer 20 refrains from transmission at least until no more signals are transmitted by other nodes 12a,b, 14. When the interface layer 20 detects disturbance of its transmitted signal (normally by signals from other nodes 12a,b, 14) a collision is said to have occurred. In case of a collision the interface layer 20 stops producing physical signals and reattempts transmission of the colliding message at a later time.

Two types of applications 25a,b are shown in application layer 24. A first type of application 25a needs a specified minimum amount of bandwidth per unit time to provide a guaranteed quality of service. Typically such an application 25a perform functions that need a real-time data flow, such as rendering of audio and/or video information without any appreciable storage (longer than a unit of time) of the data making up the audio and/or video information. A second type of application 25b does not need such a minimum amount of bandwidth. Two types of regulating interfaces 23a,b are shown in regulating layer 22 for the first and second type of application respectively. Although separate applications 25a,b and regulating interfaces 23a,b are shown each node may in fact contain only one of both. Also, without deviating from the invention the application 25a that needs to provide a minimum quality of service may be integrated with its regulating interface 23a.

Controller 18 controls the amount of bandwidth used by the nodes 12a,b, 14. Controller 18 does so in a way that guarantees a minimum available bandwidth for applications of the first type 25a for which it has been indicated that these applications need a specified minimum amount of bandwidth per unit time Controller 18 implements control of the bandwidth by setting in each node 12a,b, 14 a maximum bandwidth value that controls operation of the regulating interface 23b for the applications 25b that do not need a minimum specified amount of bandwidth. The maximum bandwidth value sets the maximum bandwidth that regulating interface 23b may use to pass information from the application 25b to the interface layer 20. Regulating interface 23b may implement this for example using a drip mode, passing no more than a set amount of data to interface 20 per unit time and signaling to application 25b that application 25b can generate subsequent data only when not too much of its previous data is waiting for transmission. This mechanism is transparent for application 25b.

Controller 18 computes the maximum amounts of bandwidth for the nodes 12a,b, 14 on-line. Controller 18 determines how much bandwidth has to be guaranteed for applications 25a that need a minimum quality of service and assigns this bandwidth to the relevant nodes 12a,b, 14. Controller 18 computes the remaining amount of bandwidth and divides this remaining amount of bandwidth in fractions that controller assigns to the nodes 12a,b, 14. Controller 18 then signals the amount of bandwidth in the assigned fraction of the node 12a,b 14 to the regulating interface 23b for the second type of application 25b.

Figure 3:
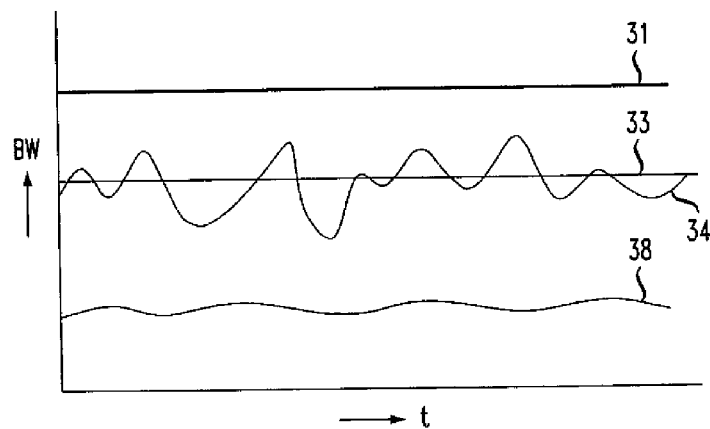
FIG. 3 shows available and used bandwidth over time.

FIG. 3 shows a graph of bandwidth as a function of time. A first trace 31 of the graph shows the theoretically available amount of bandwidth. A second trace 33 shows average amount of the actually available of bandwidth. The actually available of bandwidth differs from the theoretically available amount of bandwidth for example because of bandwidth lost to collisions and bandwidth needed for various control purposes. A third trace 34 shows the actually available amount of bandwidth as a function of time.

A fourth trace 38 shows the amount of bandwidth needed by applications 25a that have to provide a minimum quality of service. The gap between the fourth trace 38 and the third trace represents the amount of bandwidth available for applications 25b that do not need a guaranteed minimum amount of bandwidth.

Preferably, controller 18 reserves part of the gap as a safety margin to ensure that the required minimum bandwidth remains available to provide quality of service even if there are fluctuations in the available amount of bandwidth. Controller 18 distributes the remaining part of the bandwidth is distributed over the nodes 12a,b, 14.

Figure 4:
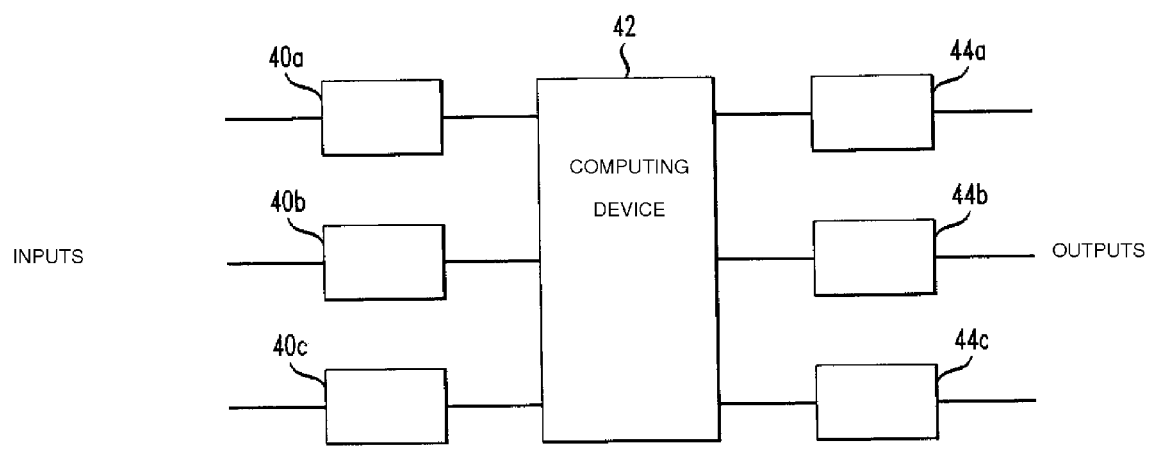
FIG. 4 shows a controller.

FIG. 4 shows a controller 18. Controller 18 has inputs 40a–c for receiving statistical information from the nodes 12a,b, 14 (not shown) about measured bandwidth use. Although separate inputs are shown, a single physical input may be used in fact, for example for receiving information from different ones of the nodes 12a,b, 14 successively via the shared medium. The inputs also receive information about reservation of a minimum amount of bandwidth for applications 25a that have to provide a minimum quality of service. The inputs 40a–c are coupled to a computing device 42 that uses the statistical information to compute assigned amounts of bandwidth. The computing device 42 is coupled to outputs 44a–c for transmitting information representing the assigned amounts to the regulating interfaces 23b of the nodes 12a,b, 14. As in the case of the inputs 40a–c, a single physical output may in fact be used, similarly as in the case of the inputs 40a–c. When controller 18 is incorporated in one of the nodes 12a,b, 14 fewer inputs and output may be needed.

As a first step controller 18 computes a prediction P of the amount of available bandwidth of the shred medium. Theoretical relations are available that relate the available bandwidth to the traffic load (the number of bytes transmitted per second) and the number of nodes that use the shared medium. Of course this relation depends on the type of medium and the protocol used. Preferably, controller 18 determines the available bandwidth as a function of these parameters. However, as an alternative controller 18 may measure the available amount of bandwidth as a function of time. In principle the last previously computed available amount of bandwidth may be used to predict the future available amount of bandwidth. In order to minimize the effect of fluctuations, however, preferably the minimum of this last previously computed available amount of bandwidth and an average of this amount of bandwidth over a longer period of time is used as a prediction of the future available amount of bandwidth.

As a second step controller 18 computes the amount of bandwidth B available for other applications 25b than the applications 25a that need to provide quality of service. This is realized by subtracting the amount of bandwidth that has been indicated as needed for applications 25a that need to provide quality of service from the predicted available bandwidth P. Preferably also a safety margin is also subtracted.

As a third step controller distributes the bandwidth B among the nodes 12a,b, 14. Preferably a fixed minimum amount of bandwidth M is allocated to each node 12a,b, 14 and the remainder $R=B-n*M$ is allocated in proportion to the predicted needs of the node 12a,b, 14 ("n" being the number of nodes 12a,b, 14).

Preferably, the remainder R is distributed in proportion to the predicted bandwidth needs of the nodes 12a,b, 14. In an embodiment these bandwidth needs are determined by measuring the quantity of data that is waiting for transmission in the regulating interface 23b of each node. The regulating interface 23b of each node 12a,b, 14 periodically determines this quantity and sends information representing the average of this quantity to controller 18. Controller 18 computes the total amount of waiting data and the fraction Fi of this total amount that is waiting at each node 12a,b, 14 (i in Fi is an index indicating the node 12a,b, 14). Controller 18 assigns an amount of bandwidth $Fi*R$ proportional to this fraction to each node i. Thus, the total amount T of bandwidth assigned to a node 12a,b other than bandwidth to provide quality of service, is $T=M+Fi*R$. Controller 18 sets the regulating interfaces 23b in the nodes to use no more than this assigned bandwidth T.

Of course, different assignments may be used without deviating from the invention. For example, a weight may be assigned to each node, a relatively higher fraction of the remaining bandwidth R being assigned to nodes with a higher weight, in proportion to the weight.

The assignment of bandwidth may be refined in various ways. For example, the fraction Fi of the remaining bandwidth R may be varied according to transmission quality from a node 12a,b 14 and/or average packet size from the node, i.e. the number of data items per message from the node 12a,b, 14.

Communication quality affects the relation between the effective transmission rate of a node and the average quantity of waiting data. By means of a correction factor determined from the communication quality, the effective transmission rate can be computed from the average quantity of waiting data. Preferably controller uses the effective transmission rate instead of the quantity of waiting data to compute the fractions Fi.

Average packet size also affects the relation between the effective transmission rate of a node and the average quantity of waiting data. By means of a correction factor determined from the average packet size used by the node 12*a,b*, 14, the effective transmission rate can be computed from the average quantity of waiting data In a wireless LAN messages sent by nodes 12*a,b* are received by relay node 14. Relay node 14 determines for each message whether the message is destined for another node 12*a,b* in the wireless cell 10 or for a destination coupled to network 16. If the message is destined for another node 12*a,b* relay node 14 retransmits the message in the wireless cell 10. Similarly, relay node 14 receives messages from network 16 and retransmits these messages in wireless cell 10 if the messages are destined for a node 12*a,b* in the wireless cell 10.

Thus, when the original transmitting node 12*a,b* uses a certain amount of bandwidth for messages, double this amount of bandwidth of the cell is actually consumed when the messages are destined for other nodes 12*a,b* in the cell 10 (excluding the relay node 14), because the relay node 14 relays the message.

Controller 18 preferably also accounts for this double bandwidth use during the allocation of bandwidth to the nodes 12*a,b*. First of all controller 18 determines whether an application 25*a* that reserves a minimum amount of bandwidth to provide quality of service will use this bandwidth for transmissions destined for another node 12,a,b in the cell 10. If so, controller 18 reserves a double amount of bandwidth. Of course only single this amount is reserved for exchanges with devices in network 16.

Secondly, controller 18 distributes the bandwidth B available for messages that do not need to support a minimum quality of service according to the need for transmission to destinations within the cell 10. In an embodiment controller reserves a first fraction of this bandwidth B for messages destined within the cell 10 and a remaining second fraction for other messages (or the controller ensures that messages destined within the cell 10 will be able to use the first fraction if there are sufficient messages destined within the cell, the other messages being allowed part of the first fraction when the messages destined within the cell do not use up the first fraction). Controller 18 may set the size of these fractions for example to 50% each, or controller 18 may set the size proportionally fraction of actually observed traffic within the cell 10 and traffic that passes outside the cell. Relay node 14 may be used to measure these fractions. Subsequently, controller 18 distributes the bandwidth within each fraction in any of the ways described in the preceding.

The invention claimed is:

1. A data communication system comprising a communication medium providing a bandwidth for communication; a plurality of communicating nodes, the nodes sharing access to the bandwidth with each other on the basis of contention, each node comprising a regulator for regulating an amount of the bandwidth that the node will attempt to use for transmissions, at least part of the nodes being arranged for reserving a guaranteed amount of the bandwidth for quality of service transmissions; and a controller arranged to compute a respective amount of assigned bandwidth for each node based on a ratio between the current bandwidth demand of that node of the nodes and a total combined current bandwidth demand of the nodes so as to track an on-line predicted demand for bandwidth of that node, the sum of the amounts of assigned bandwidth not exceeding a total available amount of bandwidth minus the amount of guaranteed bandwidth reserved for quality of service transmissions, the controller setting the regulator of each node so as to prevent the node from attempting to use more than the amount of assigned bandwidth for that node for transmissions other than quality of service transmissions.

2. The data communication system according to claim 1, wherein each node comprises means for determining an quantity of data queued for communication at the node during a preceding time interval and transmitting information about said quantity of data queued to the controller, the controller being arranged to predict the demand for bandwidth on the basis of the quantity of queued data.

3. The data communication system according to claim 1, wherein the controller being arranged to compute the respective amount of assigned bandwidth for a first one of the nodes in at least partly in proportion to the total available amount of bandwidth minus the amount of guaranteed bandwidth reserved for quality of service transmissions, multiplied by a said ratio between the current bandwidth demand of that node of the nodes and a total combined current bandwidth demand of the nodes.

4. The data communication system according to claim 1 wherein the controller computes the amounts of assigned bandwidth by distributing an amount of the bandwidth of the medium left after subtraction the amount of guaranteed bandwidth and an estimated amount of unusable bandwidth.

5. The data communication system according to claim 1, wherein at least one of the nodes comprises: a medium interface for implementing contention based transmission to the medium; and a regulating interface arranged to support reception of data from an application program and to pass that data to the medium interface at a rate controlled by the amount of assigned band with for the at least one of the nodes.

6. A data communication system comprising a communication medium providing a bandwidth for communication; a plurality of communicating nodes, the nodes sharing access to the bandwidth with each other on the basis of contention, each node comprising a regulator for regulating an amount of the bandwidth that the node will attempt to use for transmissions, at least part of the nodes being arranged for reserving a guaranteed amount of the bandwidth for quality of service transmissions; and a controller arranged to compute a respective amount of assigned bandwidth for each node based on a ratio between the current bandwidth demand of that node of the nodes and a total combined current bandwidth demand of the nodes so as to track an on-line predicted demand for bandwidth of that node, the sum of the amounts of assigned bandwidth not exceeding a total available amount of bandwidth minus the amount of guaranteed bandwidth reserved for quality of service transmissions, the controller setting the regulator of each node so as to prevent the node from attempting to use more than the amount of assigned bandwidth for that node for transmissions other than quality of service transmissions, wherein at least one of the nodes being a relay node for relaying messages destined for nodes via the shared medium, the controller being arranged to compute the respective amounts of assigned bandwidth so that the sum of the amounts of assigned bandwidth does not exceed the total available amount of bandwidth minus twice the amount of guaranteed bandwidth reserved by nodes for quality of service transmissions that the relay node has to relay via the shared medium, and minus the amount of guaranteed bandwidth reserved for quality of service transmissions destined to devices for which no relay is needed.

7. A data communication system comprising a communication medium providing a bandwidth for communication; a plurality of communicating nodes, the nodes sharing access to the bandwidth with each other on the basis of contention, each node comprising a regulator for regulating an amount of the bandwidth that the node will attempt to use for transmissions, at least part of the nodes being arranged for reserving a guaranteed amount of the bandwidth for quality of service transmissions; and a controller arranged to compute a respective amount of assigned bandwidth for each node based on a ratio between the current bandwidth demand of that node of the nodes and a total combined current bandwidth demand of the nodes so as to track an on-line predicted demand for bandwidth of that node, the sum of the amounts of assigned bandwidth not exceeding a total available amount of bandwidth minus the amount of guaranteed bandwidth reserved for quality of service transmissions, the controller setting the regulator of each node so as to prevent the node from attempting to use more than the amount of assigned bandwidth for that node for transmissions other than quality of service transmissions, wherein at least one of the nodes being a relay node for relaying messages destined for nodes via the shared medium, the controller being arranged to make separate predictions of a first demand for transmissions that the relay node has to relay via the shared medium and a second demand for transmissions that the relay node does not have to relay via the shared medium, the controller computing the assigned amount of bandwidth so that the assigned amount of bandwidth tracks a sum of the second demand and twice the first demand.

8. The data communication system according to claim 7, wherein the controller being arranged to compute the respective amount of assigned bandwidth for a first one of the nodes in proportion to a sum of a first and a second assigned bandwidth, assigned in proportion to a first and second ratio between the first demand a total combined first demand of the nodes and the second demand a total combined second demand of the nodes respectively.

9. A method of communicating via a shared medium that provides a limited amount of bandwidth, the method comprising: using a contention based access protocol to access the medium from respective nodes; reserving a guaranteed amount of the bandwidth for quality of service transmission via the medium; computing a respective amount of assigned bandwidth for each particular one of the nodes based on a ratio between the current bandwidth demand of that node of the nodes and a total combined current bandwidth demand of the nodes so as to track an on-line predicted demand for bandwidth of that particular one of the nodes, the sum of the amounts of assigned bandwidth not exceeding a total available amount of bandwidth minus the amount of guaranteed bandwidth reserved for quality of service transmissions; and setting regulators in the respective nodes so as to prevent the nodes from attempting to use more than the amounts of assigned bandwidth for the nodes for transmissions other than quality of service transmissions.

10. A controller for use in a communication system that contains nodes coupled to a communication medium providing a bandwidth for communication, the controller being arranged to compute a respective amount of assigned bandwidth for each node based on a ratio between the current bandwidth demand of that node of the nodes and a total combined current bandwidth demand of the nodes so as to track an on-line predicted demand for bandwidth of that node, the sum of the amounts of assigned bandwidth not exceeding a total available amount of bandwidth minus an amount of guaranteed bandwidth reserved for quality of service transmissions, the controller being arranged to regulators in the nodes so as to prevent the node from attempting to use more than the amount of assigned bandwidth for that node for transmissions other than quality of service transmissions.

* * * * *